May 5, 1925.  1,536,258
A. DAY
MACHINE FOR MAKING AND FILLING PACKETS
Filed Jan. 18, 1923   8 Sheets-Sheet 1
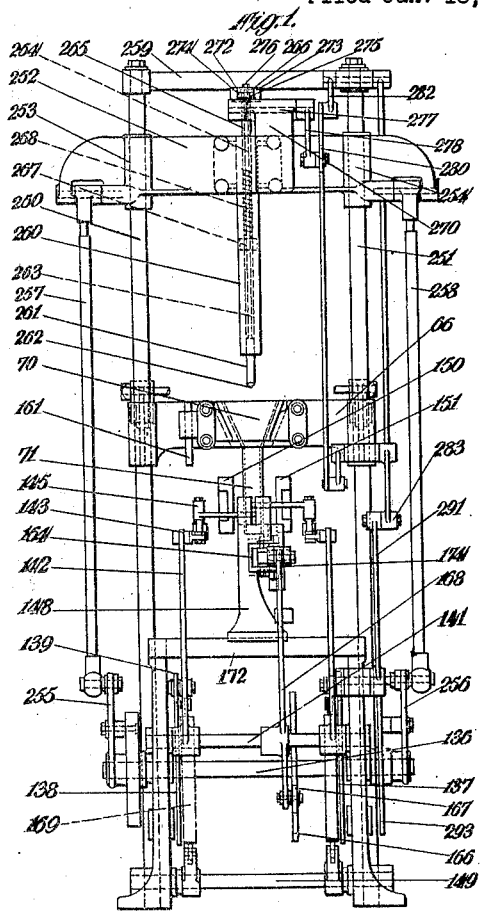
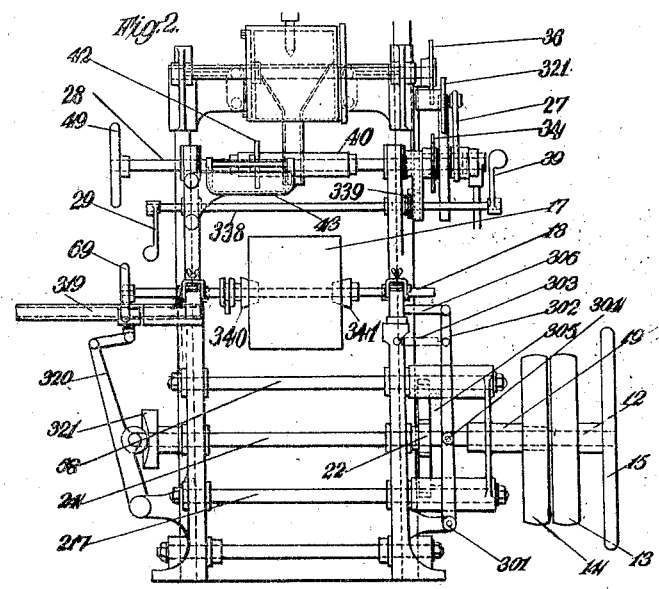

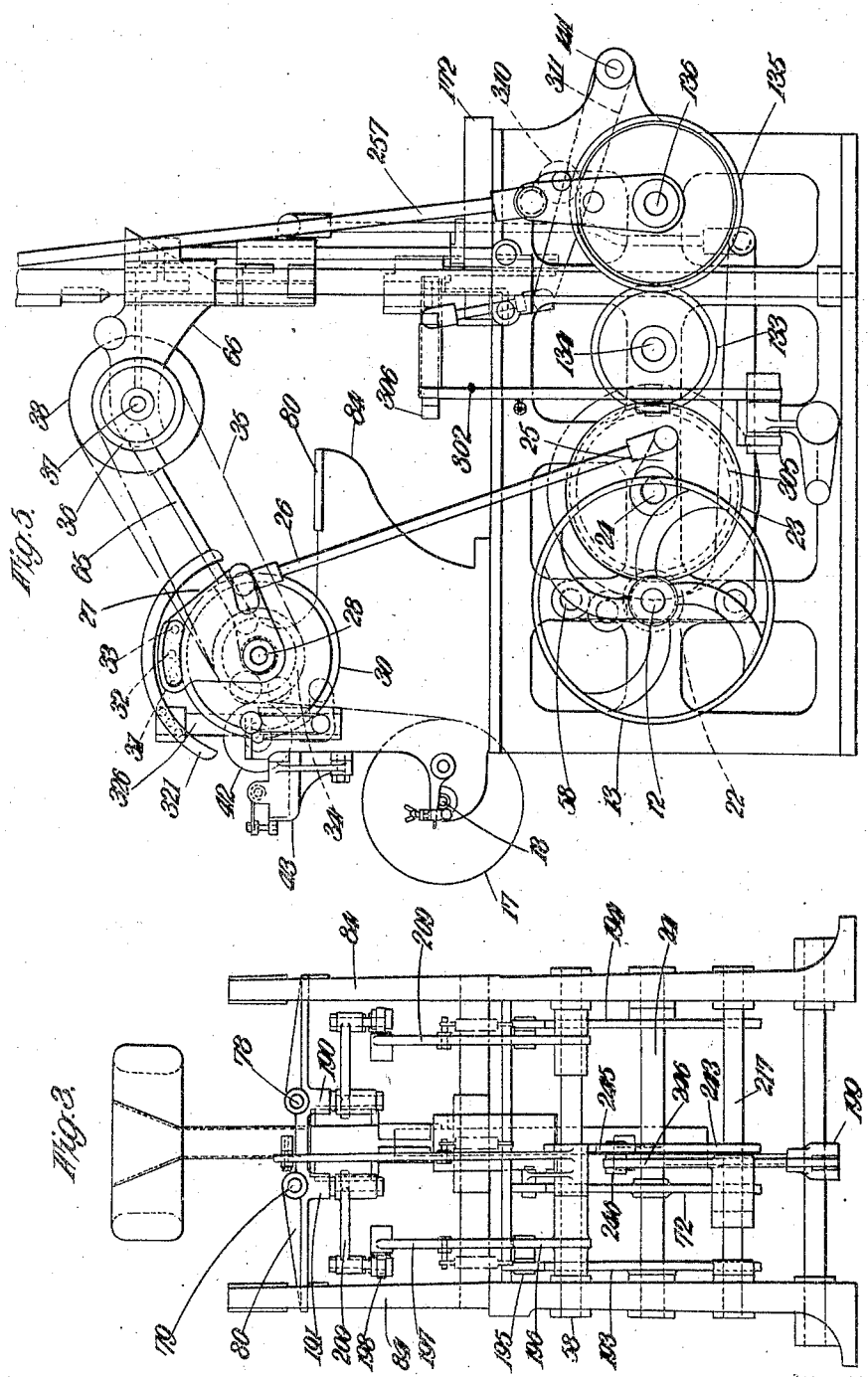

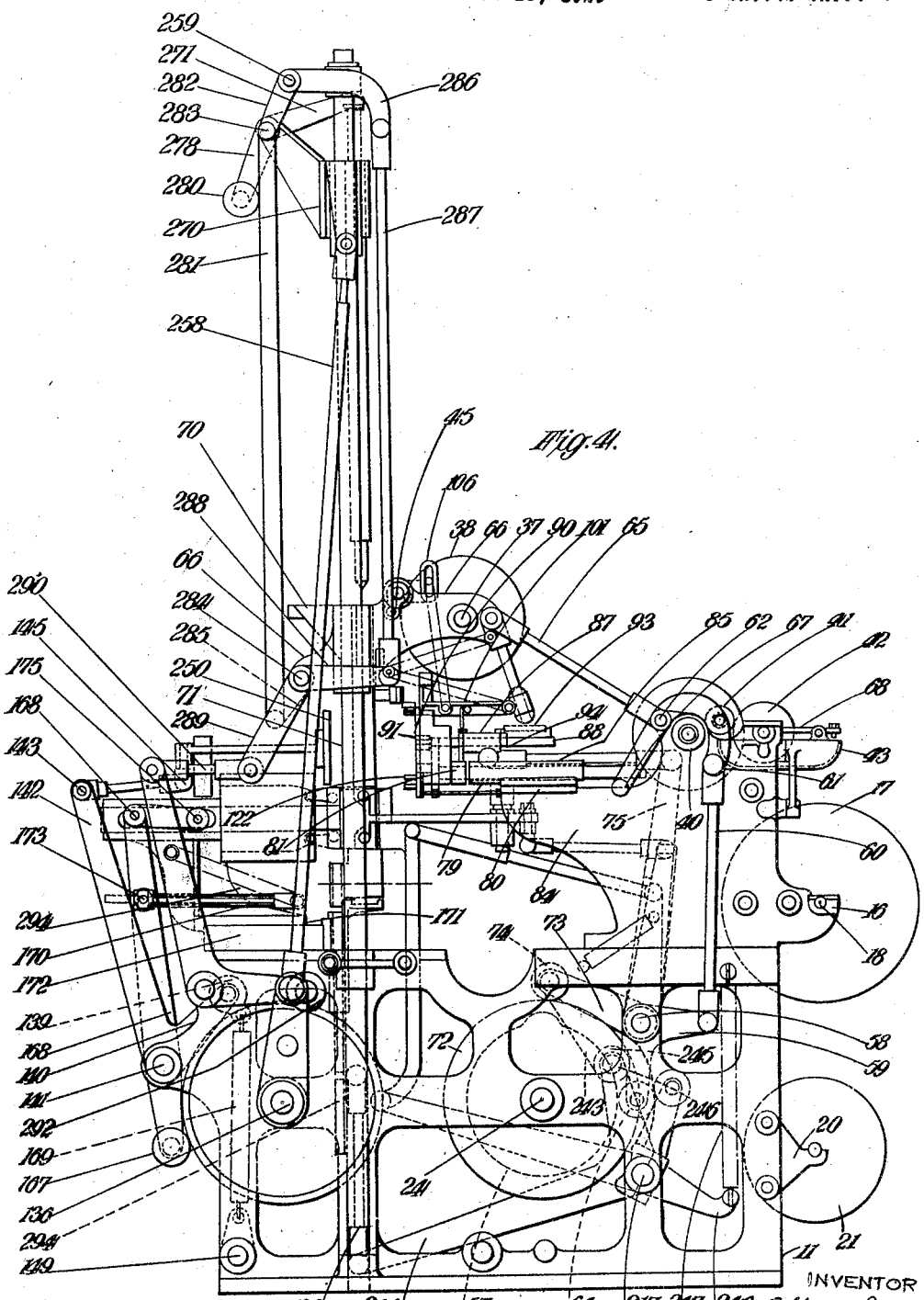

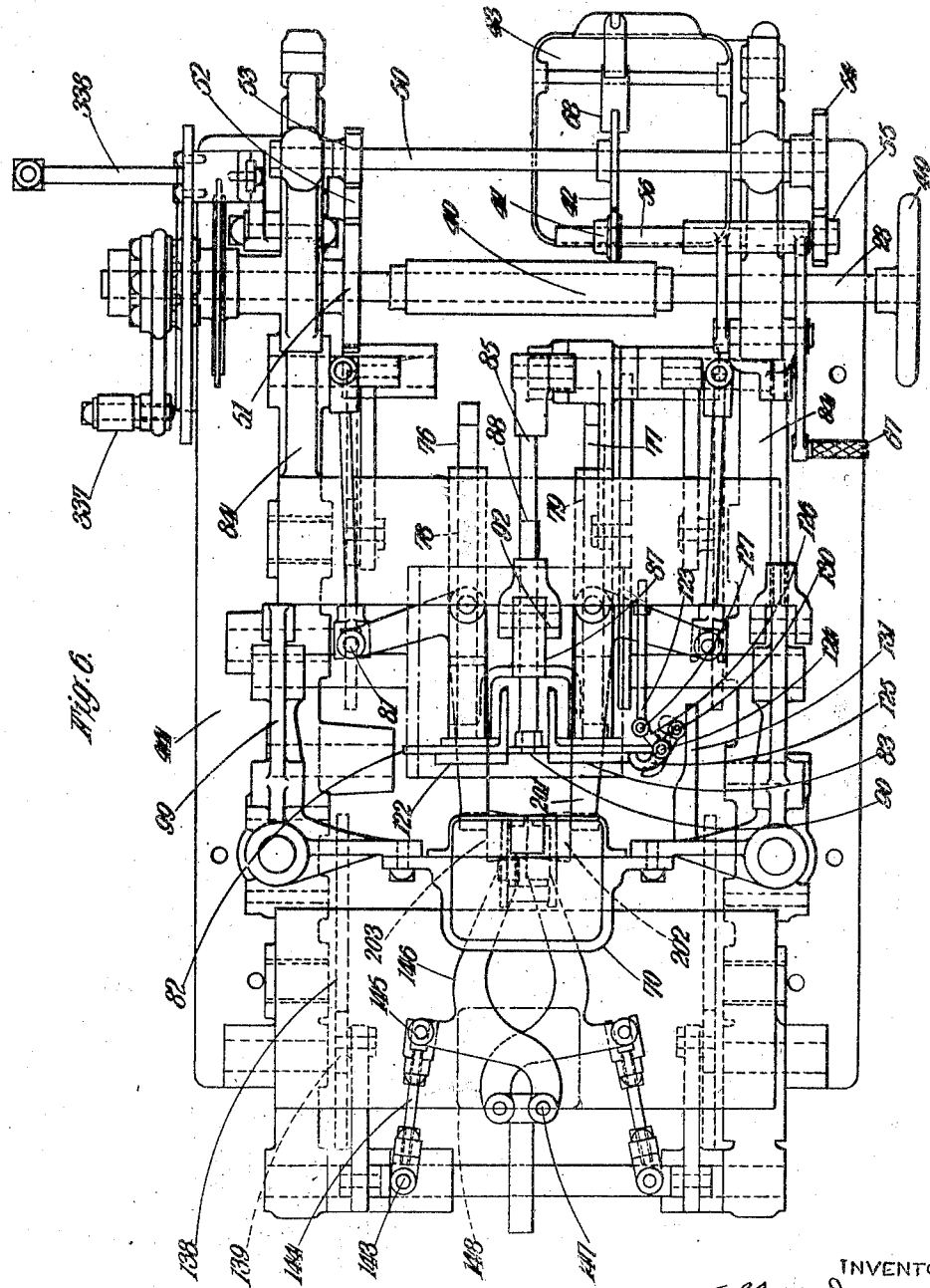

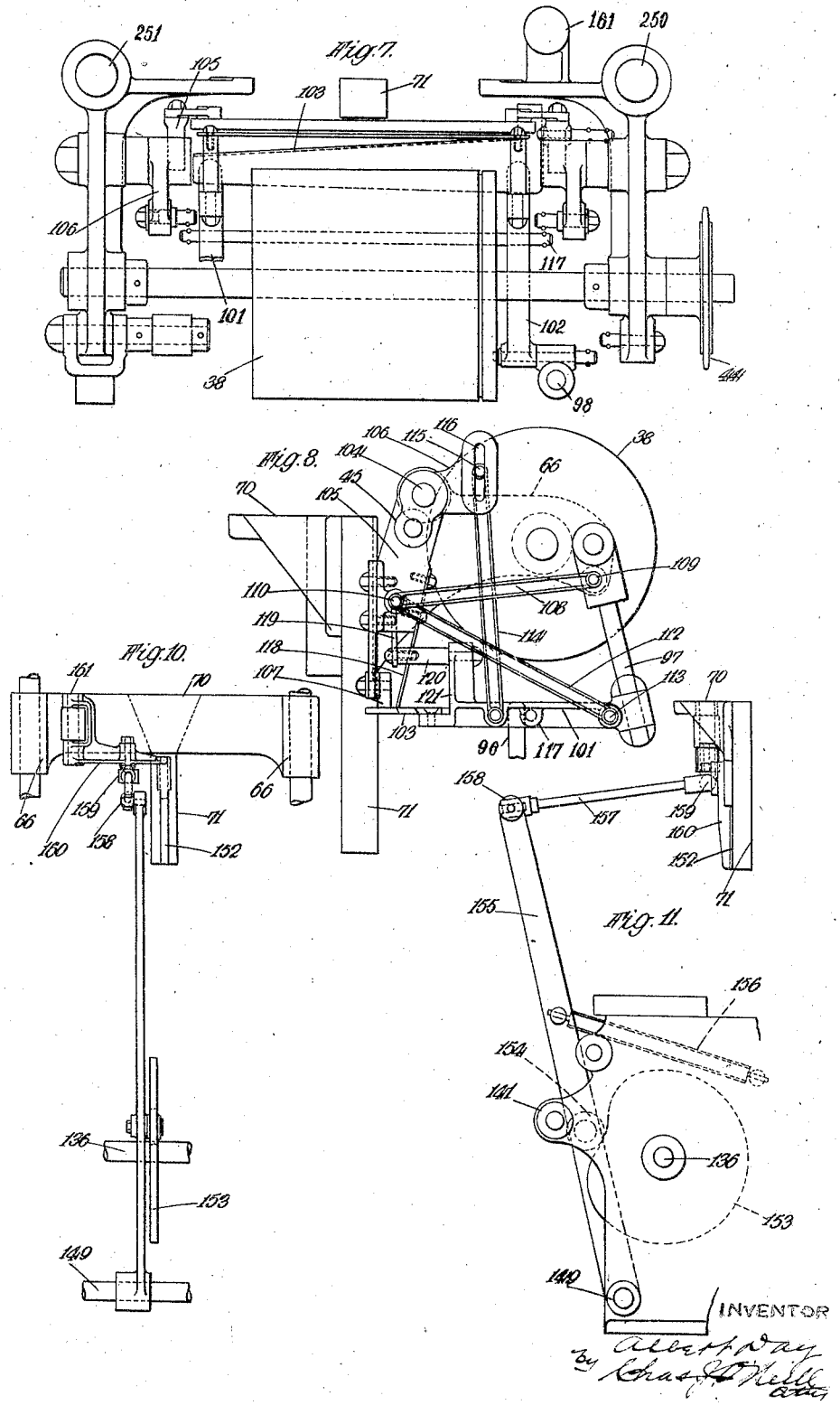

Fig. 9.

May 5, 1925.
A. DAY
MACHINE FOR MAKING AND FILLING PACKETS
Filed Jan. 18, 1923    8 Sheets-Sheet 7
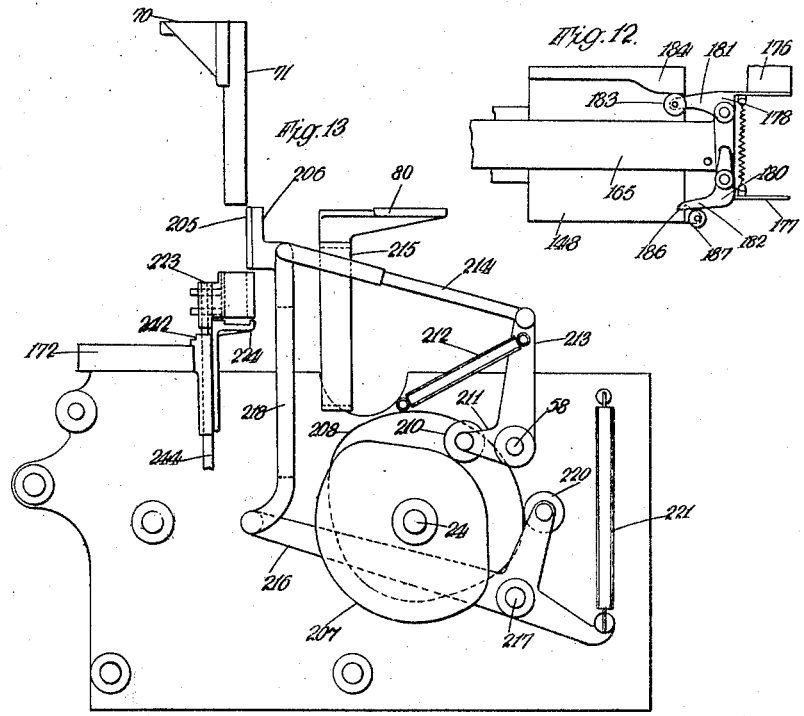
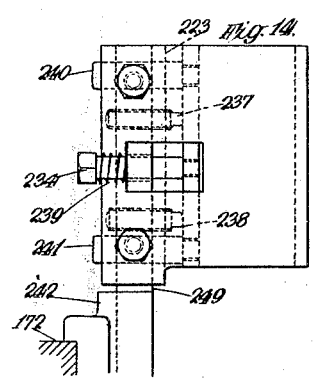
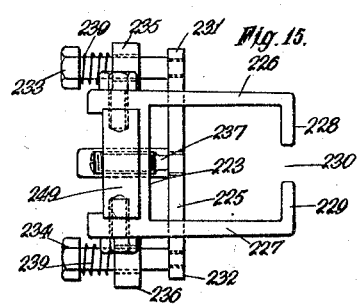
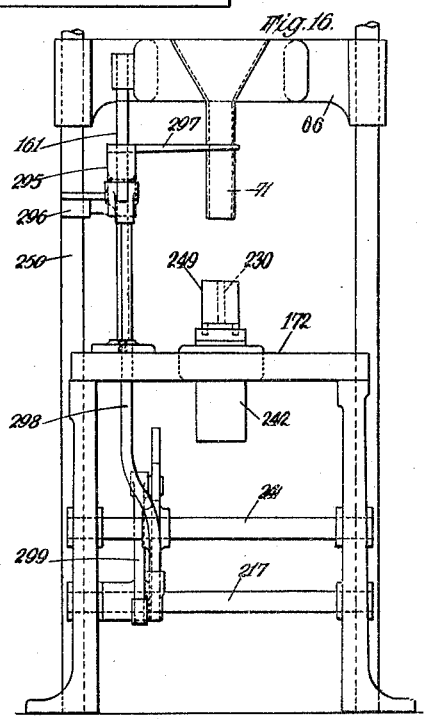
INVENTOR
Albert Day

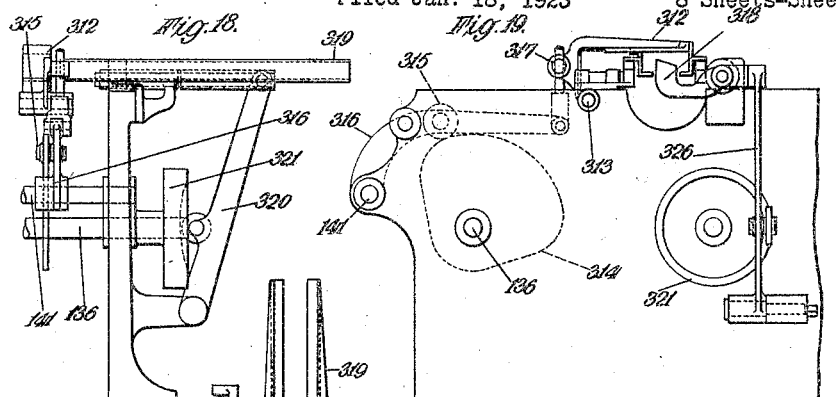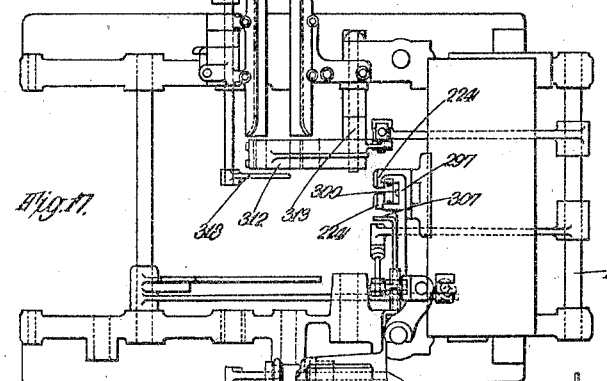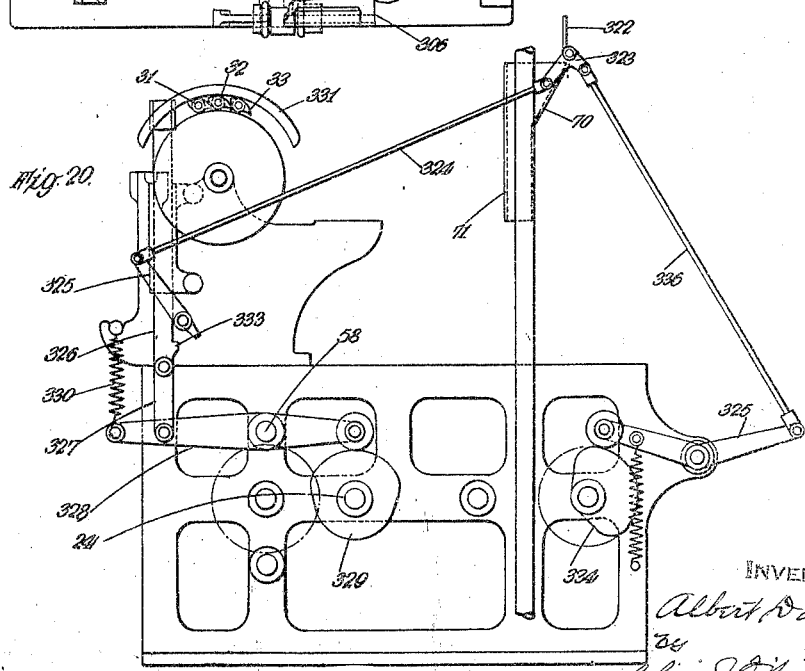

Patented May 5, 1925.

1,536,258

UNITED STATES PATENT OFFICE.

ALBERT DAY, OF LONDON, ENGLAND.

MACHINE FOR MAKING AND FILLING PACKETS.

Application filed January 18, 1923. Serial No. 613,443.

*To all whom it may concern:*

Be it known that I, ALBERT DAY, a subject of the King of Great Britain, residing at 53 Winsham Grove, London, S. W. 11, England, have invented certain new and useful Improvements in Machines for Making and Filling Packets, of which the following is a specification.

The subject of this invention is a machine for making and filling packets with tea, tobacco, powders, seeds, or other materials, the said machine being of such construction that if so required it can be used for the manufacture of paper bags without filling them.

The main objects of this invention are to make and fill each packet at a single filling station in the machine, whereby the mechanism therefor is concentrated and reduced to the minimum number of working parts in contact with the packet, and to produce filled packets at a very high speed, while minimizing the risk of spilling the material being charged.

According to this invention a set or each set of the principal operative parts of the machine, that is, the funnel, rammer, folders for closing the top and bottom of the bag, the mould, and ejector platform, are arranged in vertical relation to each other so that two cycles of operations can proceed simultaneously, one cycle comprising the formation of the tube of paper or the like on the stem of the funnel, closing the bottom of said tube to constitute a bag, lifting the rammer in the funnel to allow the whole charge to fall into the bag while the bag is still on the funnel, transferring the charged bag to the mould, and ramming the charge before, during or after such transfer, while the other cycle comprises folding the top of the last preceding bag to form a packet in the mould, lifting the mould clear of the said packet, which then lies on the ejector platform at the bottom of the mould, and ejecting the said packet laterally before the mould returns.

The formation of the paper tube on the funnel stem is accomplished in the usual way by a folding box advancing to embrace the stem or funnel, the edges of the wrapper or sheet of paper or the like, one of which edges has previously been coated with an adhesive substance, being then turned in and rubbed to seal the tube. The folding or turning in of the part of the tube projecting below the stem of the funnel is also effected as usual by reciprocating members or "folders" consecutively advancing towards or across the axial line of the tube, but the first folder according to this invention has four functions, namely,—to make the first fold or ply of the bag bottom,—to support the said fold and close the outlet of the funnel while the full charge is being dropped on to it, which takes place while the other folds are being made,—to provide a backing or support during the action of the second and third folders—and to control the first fold and prevent leakage of the material into the "ears" of the packet, this control continuing until the fourth folder comes into action. The fourth folder has a movement in an approximately rectangular path, namely, forward across the bag, downward with the bag through the mould, which is slotted to give this folder a passage, then backward leaving the filled bag resting on the ejector platform, and upward to the position at which it begins its forward stroke, thus continuing the control of the bag bottom during its transfer from the funnel to the ejector platform.

The mould may comprise a movable inner plate supported by springs, which facilitate the entry of the filled bag therein, and ensures that firm packets of uniform size for one adjustment are produced by this machine, the size of the packets being however capable of some variation according to the adjustment as required of the said movable plate.

The present invention also avoids the difficulties arising in the operation of machines in which empty bags are placed in the mould, where unless the bag is perfectly made, particularly at the corners, and presented to the mould in perfect alignment, the bag is liable to crumple, when the machine has to be stopped to remove it, and the charge of the imperfect bag may be wasted, whereas in the present machine should an imperfect bag reach the mould, the mould tends to straighten it. The machine can also be readily adapted by small adjustments or exchange of working parts for making packets of different sizes and shapes.

In order that the said invention may be clearly understood and readily carried into effect, the same will now be described more fully with reference to the accompanying drawings, in which:—

Figure 1 is a front elevation of a machine for carrying out the above process.

Figure 2 is a rear elevation of a portion of the said machine.

Figure 3 is a rear elevation of a portion of the machine from which the gumming mechanism and the rolls of paper have been removed.

Figure 4 is an elevation of the right hand side of the said machine.

Figure 5 is an elevation of a portion of the left hand side of the said machine.

Figure 6 is a plan of the said machine.

Figure 7 is a detail showing in plan the paper feed drum and paper cutting mechanism.

Figure 8 is a detail showing in side elevation the parts shown in Figure 7.

Figure 9 is a plan of mechanism for closing the tube, showing also the second and third folders.

Figure 10 is a front elevation of the mechanism for sealing the packet.

Figure 11 is a side elevation of the mechanism shown in Figure 10.

Figure 12 is a side elevation of the mechanism for making the first fold.

Figure 13 is a side elevation of the mechanism for making the last fold.

Figure 14 is a side elevation of the mould.

Figure 15 is a plan of the mould.

Figure 16 is a front elevation of mechanism for assisting the transfer of the bag from the former to the mould.

Figure 17 is a plan of the packet ejector mechanism.

Figure 18 is a rear elevation of the packet ejector mechanism.

Figure 19 is a side elevation of the packet ejector mechanism.

Figure 20 is an elevation of mechanism for automatically stopping the feeding of the paper upon the cessation of the feeding of the material to be packed.

Figure 9:
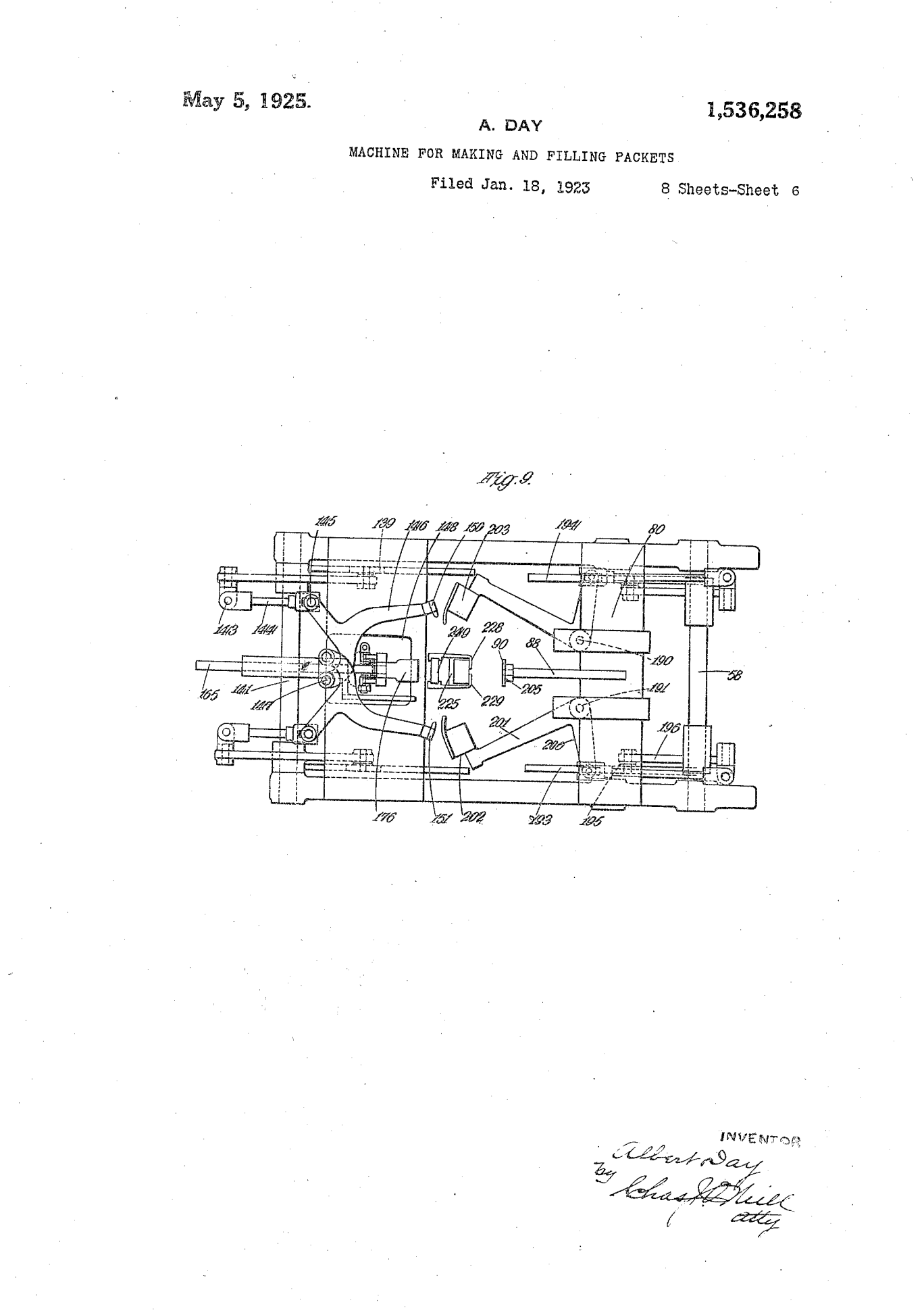

The reference numeral 11 indicates the framework of the machine, on which are upward extensions 84 supporting a table 80 and connected by a stay rod 62, pillars 250 and 251 connected by a stay rod 259 and carrying brackets 66 at each side of the machine. Stay rods 65 connect the brackets 66 with the extensions 84. 12 indicates the driving shaft, on which are mounted a fast pulley 13 and a hand wheel 15 (see Figure 2). The loose pulley 14 runs on a bush or sleeve 19. On the driving shaft 12 is a toothed pinion 22 (see Figure 5) in gear with a toothed wheel 23 on the first motion shaft 24. The rotary shaft 134 is driven through a wheel 133 also engaging the wheel 23, and the rotary shaft 136 is driven through a wheel 135 engaging the wheel 133. The shaft 28 is rotated step by step by pawls actuated through connections from a crank on the shaft 24 as hereinafter described, and the shafts 37 and 50 are driven from the shaft 28. Stay rods 58, 62, 104, 141, 149 and 217 are utilized for the attachment of movable parts of the mechanism. The "former" is shown at 71, the upper parts of the four folders at 165, 202, 203 and 205 respectively, (see Figures 9, 12, and 13) the back wall of the mould at 223, (Figure 15) and the rammer at 260. The means for obtaining the required movements will be understood from the following description.

In a bearing 16 a roll of paper or the like 17 is supported by a pin 18 therein, and the said roll 17 is freely rotatable to allow the paper to be drawn off. A bracket 20 provides a bearing for a second roll of paper 21, (Figure 4) which is only required in cases where two thicknesses of paper are used on each packet made, for example an outer layer which may exhibit the name of the trader in such packets, and an inner layer of tissue paper or greaseproof paper to protect the contents. When two rolls of paper are used, the lower one is set a little to one side of the upper one in order to leave a narrow space along one edge of the outer sheet of paper clear for the reception of gum or other adhesive material for securing the packets when made. Although the machine can thus obviously be used for making packets having two or more layers of paper or the like, in the following description it is assumed that the roll 21 is absent and that only one thickness of paper or the like is employed.

The roll 17 is held in position on the pin 18 by cones 340 and 341; and by turning the hand wheel 69 the pin 18 with the cones and roll can be moved laterally in the machine.

On the shaft 24 is a crank arm 25 (Figure 5) which through a rod 26 is adjustably connected at 337 with and oscillates a segment 27 loose on a higher shaft 28, on which latter shaft is secured a ratchet wheel 30. The segment 27 carries one or more pawls, which in the case of more than one pawl being employed are of slightly different lengths. Preferably three pawls are employed as shown and indicated by the numerals 31, 32, 33, one of which pawls will engage the nearest tooth on the said ratchet wheel 30 to impart an intermittent rotary movement in one direction only to the shaft 28. The object of employing a plurality of pawls is to get a fine adjustment of the paper feed without employing very fine teeth on the ratchet wheel, as teeth of coarser pitch are found to wear longer, and to allow the pawls to engage more easily. On this shaft 28 is a pulley or chain wheel 34 operatively connected by a belt or chain 35 with a pulley or chain wheel 36 on another shaft 37 in the bracket 66, which shaft 37 is thereby caused to impart as intermittent rotation to a paper feed drum 38 thereon (shown in dotted lines in Figure 6).

From the roll 17 the strip of paper or the like, the path of which is indicated in dot-and-dash lines, is drawn off by the pull of the drum 38, and on the way to the said drum it passes over a roller 40 of a greater width than that of the paper, which roller 40 is freely rotatable, and in contact with a small roller 41 which may be made of rubber, and is also in contact with the flange of a disc 42 (Figures 4 and 5) which dips into a trough 43 containing gum or other adhesive material, such adhesive material being thus transferred by the disc 42 to the roller 41 and thereby to one edge of the travelling strip of paper. The paper then passes between the drum 38 and a guide roller 45.

A hand wheel 49 (Figure 2) on the end of the shaft 28 can be used when the forward end of a new roll of paper is to be inserted, for winding the said paper from the roll 17 to the drum 38. The gumming disc 42 is carried on a shaft 50 (Figure 6) which is driven by a train of gearing from the shaft 28, and drives the shaft 56 of the roller 41 through gears 54 and 55, the proportions of the respective gears being such that the peripheral speed of the roller 41 and disc 42 shall be the same as that of the paper feed drum 38.

On the first motion shaft 24 is a cam 57 (Figure 4) with which engages a bowl 64 on one arm of a bell crank lever 59 on a fixed rod 58, this lever 59 being connected by a rod 60 to a curved lever 61 pivoted to the stay rod 62. The lever 61 carries the shaft 56 of the rubber roller 41 and is caused by the operation of the cam 57 to lift the roller 41 clear of the travelling strip of paper passing over the guide roller 40 once in each revolution of the shaft 24, in order to produce a gap in the streak of gum on such paper at the part where a cut will be required for the purpose of severing a sheet of paper from the travelling strip as hereinafter described, this being desirable for the purpose of avoiding clogging of the cutting mechanism by gum.

The roller 41 can be thrown out of action by depressing the handle 67 (Figures 4 and 6) so as to lift the curved lever 61, in order to prevent the said roller 41 from becoming stuck to the paper if at any time the machine is left standing. A scraper 68 (Figures 4 and 6) may be arranged to remove superfluous gum from the disc 42.

On the shaft 24 is a cam 72 and on the rod 58 is movable a bell crank lever 73 having at its end a bowl 74 engaging the said cam 72 by means of the rotation of which the long arm 75 of the said bell crank lever is caused to reciprocate a rod 85 connected with a box 81, Figures 4 and 6.

Guide rods 76 and 77 pass respectively through and work in fixed sleeves 78, 79 in a bracket 80 secured in extensions 84 of the machine frame (see Figure 3) and are secured to and carry the back framework of the box 81, to which box are secured flanged plates 82, 83, forming the front and inner walls of the box.

On the back of the box 81 is a bracket forming a sleeve 87 through which works a rod 88 carrying at its front end a plate 90 which in the position shown in Figure 6 is in line with the parts 82, 83, and forms the front wall of the box, in front of which a sheet of paper can be placed. Below the sleeve 87 the bracket 86 also forms a boss 91 through which passes a pin on the rod 85, by which means the oscillation of the lever 75 as aforesaid conveys a reciprocatory movement to the box 81. On the boss or sleeve 87 is a spring 93 connected with the rod 88 and tending to pull the said rod forward relatively to the box 81, the forward movement of which rod 88 is limited by a stop collar 94 thereon engaging the rear end of the sleeve 87.

Pivoted on the brackets 66 are a pair of adjustable oscillating links 97, (Figure 8) and 98 (Figure 7) carrying at their lower ends bearings in which are pivoted a pair of arms 101, (Figure 8) and 102, to the opposite ends of which is attached the movable blade 103 of the knife or guillotine.

On a rod 104 supported in the two brackets 66 can freely rotate a pair of two-armed levers, one of which is shown in Figures 4 and 8, such lever comprising a lower arm 105 and an upper arm 106. The arm 105 carries a blade 107 which in its action is practically a fixed resisting part, with which the movable blade 103 co-operates with a shearing action, that is, the movable blade travels in a direction normal to or perpendicular to the front of the fixed blade, but owing to the receding line of the edge of the movable blade 103 (see Figure 7) it is only cutting at one point at a time. The roller 45 is journalled in the upper portion of the lever arm 105. A spring 108 secured to the pin 110 on the arm 105 is also connected by a pin 109 to the fixed bracket 66, and draws the arm 105 and roller 45 with the required pressure against the feed drum 38, providing sufficient friction to draw the paper from the roll 17, and also thus regulating the position of the guillotine member 107. A spring 112 is secured to the fulcrum pin 113 between the arms 97 and 101, and at its other end to the said pin 110 secured on the arm 105, this spring 112 tending to advance the blade 103 towards the blade 107. A third spring 114 secured to the arm 101 is also secured to a stud 115 adjustable in a slot 116 in the arm 106, the function of this spring being to hold the knife 103 up to the fixed blade 107 with the required pressure. A vertical rod 96 (Figure 8) carried on the sleeve 87 (Figure 4) comes centrally in front of a rod 117 joining the lever 101 to its opposite or counterpart lever, so that on the return stroke of the box 81, the lever 101 and blade 103 are withdrawn, when the next length of paper can be fed into position for cutting off. A guide plate 118 is secured to the backs of the levers 105 to guide the paper coming from the roller 38 into the gap provided by the withdrawal of the plate 103, and another guide plate 119 secured on rods 120 in an upward extension 121 of the movable arm 101 dislodges the next oncoming length of paper from the fixed knife member 107, this guide plate 119 being recessed to clear the portion of the paper which is gummed.

Instead of employing a paper supply roller, a feed roller, and cutting mechanism as above described, separate sheets may be successively fed into position in the machine in any known or suitable manner from a pile of such sheets.

The sheet of paper severed as above described rests at its lower edge on ledges 122 (Figure 4) at the bottom of the front plates 82, 83 of the box 81 and may also be held against the front of the box at one or both sides by spring fingers as shown in Figure 6. These however may not be found necessary where the packets are made of only a single thickness of paper. A stop rod 123 is fixed in the framework of the machine; on a vertical pivot 124 at the side of the plate 83 is a three-armed gripping device comprising a curved finger 125, an arm 126 carrying at its end a bowl 127 normally pressed by a plate spring into such a position as to cause the finger 125 to press against the front face of the paper, and an arm carrying a bowl 130 adapted to engage a cam path on an arm 131 projecting from the machine framework, so that on the advance of the box the finger 125 is removed from and releases the paper and on the return stroke of the box the bowl 127 engages the end of the stop rod 123 to open the gripping device to receive a fresh sheet of paper.

The box 81 carrying the sheet of paper is advanced by the rod 85 so as to cause the plate 90 to press the centre of the sheet of paper against the back of the downward extension 71 of the hopper or funnel 70, which is secured in the framework of the machine as shown in Figure 1, this downward extension, which for making square or oblong packets is of rectangular cross section, being hereinafter called the "former." The machine can, however, be readily adapted for making packets of cylindrical or other desired shape. The movement of the rod 85 continues so that while the resistance of the "former" prevents the further advance of the plate 90 and the spring 93 is extended by the advance of the rod 88, the flanged plates 82, 83 secured to the back portion 81 of the box continue to advance at each side of the "former," and press the two side portions of the paper, which is now released by the finger 125, against the side walls of the "former" so that the vertical edges of the paper project past and in front of the "former," and the leading portions of the paper are then flattened over each other by the following mechanism:—

The wheel 23 on the shaft 24 which as previously described receives motion from the driving shaft 12 also engages a carrier wheel 133 on a shaft 134 (see Figure 5) which imparts rotation by means of a wheel 135 to a shaft 136, on which shaft are two cams 137 and 138 (see Figure 1). The cam 138 at the left hand side of the machine engages a bowl 139 on the end of one arm 140 of a bell crank lever fulcrumed on a stay rod 141, the other arm 142 of which lever is connected by a universal joint at 143 to a rod 144 which is in turn connected by a universal joint at 145 to a lever 146 pivoted at 147 to a bracket 148 on the framework of the machine (see Figures 1, 2, 6 and 9). The lever carries at its other end a flat plate 150 (Figures 1 and 4). A spring 169 anchored to a stay rod 149 at the bottom of the machine is also connected to the outer end of the arm 140 to hold the bowl 139 in contact with the cam 138. At the opposite or right hand side of the machine the cam 137 through a series of connections similar to those just described with the aid of reference numerals 139 to 148 actuates a similar flat plate 151. The flat plate 150 comes first into action and the plate 161 follows laying the gummed edge over the other edge. Before the plate 151 leaves the seam or closing edge of the paper to return to the open position shown in Figure 9, a rubber 152 comes into action to press and seal the gummed portion. On the shaft 136 (Figures 10 and 11) is a cam 153 engaging a bowl 154 on an arm 155 pivoted on the rod 149 and held to its work by a spring 156, a rod 157 being linked by universal joints at 158 and 159 to the arm 155 and to a plate 160 carrying the rubber 152 and pivoted at 161 to the bracket 66.

The paper now constitutes a tube of square cross section, the lower part of which projects below the bottom of the "former," and it is now necessary to fold the lower part inward to make a bag bottom, for which purpose four folders are caused to pass across the bottom of the "former" consecutively, each producing one fold in the paper. The folding mechanism is preferably arranged to close in the top of a lower bag already filled at the same time as the bag bottom is formed in the paper on the "former." A convenient arrangement of mechanism will now be described for making packet tops and bottoms of the "single ear" type, that is, in which the extremity of the bag presents an outer flap of triangular exterior The first folder is arranged to operate in the following manner: In the bracket 148 (Figure 1) is a recess 164 in which can work a horizontal sliding bar 165, (Figure 12). On the shaft 136 (Figure 4) is a cam 166 (Figure 1) which engages a bowl 167 on a straight lever 168 pivoted on the rod 141. At the upper part of this lever 168 is a compression spring 170 one end of which is secured to a staple on the table 172 on the frame of the machine, the other end of this spring pressing against a swivel stud 173 working in the lever 168. The top of the lever 168 is connected by a link 174 to a stud 175 (Figure 4) in the sliding bar 165 (Figure 12). At the operative end of the bar 165 two suitably shaped blades 176 and 177 are secured to two oscillating brackets respectively numbered 178 and 180. At the rear end of each oscillating bracket is an arm, these arms being numbered 181 and 182. The upper arm 181 has the required oscillating movement imparted to it by a bowl or runner 183 mounted on its end and bearing against a fixed cam path on the bracket 148. As the blades 176 and 177 are advancing they are normally inclined, but turn to a horizontal position just prior to reaching the end of their stroke, so that the edges of the blades 176, 177 first engage the edges of the paper, and in consequence of the compound forward and oscillating movements of the blades, the whole surface of each blade is in engagement with the paper when the first fold is completed, and these blades can remain in position while the second and third folds are being made, being withdrawn when the fourth or last folder comes into action.

The lever arm 182 may have a curved projection 186 engaging a bowl or runner 187 on the bracket 148 as an equivalent for the cam path, but giving a sharper movement.

The second and third folders 202 and 203 (Figures 3, 6 and 9) may be arranged to work as follows: On the aforesaid bracket 80 are two pendent bosses 190 and 191. On the shaft 24 are two cams 193 and 194. The cam 193 works the second folder and the cam 194 the third folder. The cam 193 engages a bowl 195 on one arm 196 of a bell crank lever, the other arm 197 of which is linked by a universal joint at 198 to a horizontal lever arm 200 which has a pivot in the pendent boss 191, and another arm 201 (Figure 9) which latter arm carries a suitably shaped folder block 202, which swings across the lower end of the "former" 71, forming the second fold. The cam 194 is similarly connected by the arm 209 with the folder block 203 to make the third fold.

The fourth folder block 205 (Figure 13), when the third folder 203 is at the end of its folding stroke, comes up alongside the partly folded sheet of paper, and nips the triangular folded portions thereof tightly against the side of the said block 203. This fourth folding block 205 is T shaped in plan, so that as the straight front portion travels across the bag, the rear or narrow portion 206 continues to hold down the last fold, remaining in contact with the bag until it is filled and delivered to the mould into which the bag next passes, and until the mould returns to its lowest position. This folder is operated by the following mechanism:—

On the shaft 24 are two cams 207 and 208, the first cam 207 arranged to give a horizontal movement and the cam 208 to give a vertical movement. The cam 207 acts by means of a bowl 210 on the short arm 211 of a bell crank lever pivoted on the rod 58, the long arm 213 of which lever is linked by a forked lever 214 to pivotal connections on the back of the part 206, a bracket 215 depending from the part 80 passing through the slot in the said lever 214 to guide it in its movement. A spring 212 connects the arm 213 with the machine framework to hold the bowl 210 in contact with the cam. A three-armed lever 216 pivoted on a stay rod 217 is pivotally connected with a rigid curved tail-piece 218 on the folder block 205, and carries a bowl 220 engaging the cam 208, and is connected with the machine frame by a spring 221 to maintain such engagement. The action of the cams is to impart to the folder block 205 a movement in an approximately rectangular path, namely, forward across the bag, downward with the bag through the mould, then backward leaving the bag resting on the stationary platform or bottom plate 224 of the mould, and upward to the position at which it begins its forward stroke.

Where it is required to make bags with ends of the "double ear" type, the folder above described as the "fourth folder" is timed to act immediately after the first folder, the remaining folders then forming the ears. The said "fourth folder" must therefore have an additional stroke, namely, withdrawing from the path of the usual second and third folders, and after they have fulfilled their function returning to support the bag. This additional stroke can be obtained by the use of a suitable cam.

Referring to Figures 14 and 15 the movable part of the mould comprises a back wall 223, an adjustable rear wall 225, side walls 226 and 227, and a front wall divided into two parts 228 and 229 by a slot 230 (Figure 15) which slot gives passage to the shank of the last folder. The wall 225 is held in position by lugs 231 and 232 thereon working through slots in the side walls and supported by movable bolts 233, 234 working through lugs 235, 236 fixed on the side walls, springs 239 confined between the bolt head and the fixed lugs holding the wall 225 in position against two adjustable stops 237, 238 adjustable in the fixed back wall 223. Studs 240, 241 are fixed in the back of the movable wall 225. Fixed to the table 172 is a bracket 242 in which is a recess in which works a sliding bar 249 the upper portion of which is attached to the back wall 223 of the mould. This sliding bar 249 is caused to reciprocate vertically by a cam 243 on the shaft 24 actuating a three-armed lever 244 connected by a link 199 (Figures 3 and 4) with the said sliding bar through a bowl 245 on the arm 246 of the said lever to which lever is connected a spring 247. The mould, the internal dimensions of which are slightly greater than the external dimensions of the "former," rises to enclose a bag prior to the bag's leaving the "former," and in its ascent leaves the previously made and filled packet resting on the stationary mould bottom plate or platform 224 ready for removal by ejecting mechanism; then the bar descends again, bringing down the mould and the filled bag contained within the mould walls.

The previously weighed or measured charge of tea or other material can be admitted to the hopper 70 in any known or convenient manner and falls into the bag on the former just before the mould has risen to the "former." In the example shown, at each side of the machine are pillars 250, 251, (Figure 1), on which the bracket 66 may be secured and which are connected by a stay bar 259; a crosshead 252 is provided with sleeves 253, 254, on which it works on these pillars with a vertical sliding motion, which is effected by two cranks 255, 256 mounted on the shaft 136, acting through links 257, 258 pivotally connected with the said crosshead. A rammer or stamper in the shape of a sleeve or hollow bar 260 is secured to the crosshead and has an external cross section adapting it to work within the "former" 71. Within the sleeve 260 is a plunger or auxiliary rammer 261 which has a pointed end 262 and is reduced at the part 263, further reduced at its upper part 264, on which latter part is fitted a sleeve 265 secured in position by a nut 276 which sleeve has at its upper end an extension 266. A plug 267 is secured across the bore of the sleeve 260 and perforated to give passage to the plunger 263, and a spring 268 is confined between the parts 267 and 265. On the crosshead is a bracket 270 in which is fulcrumed a lever 271 which is forked or terminates in two prongs 272, 273 having studs 274, 275 arranged to fit into recesses in the extension 266. The other end of the lever 271 is secured to a rod 277 working within the bracket 270, to the other end of which rod 277 is connected a lever 278 carrying a bowl 280 engaging a bar 281 which is caused to reciprocate laterally. On the stay rod 259 is freely mounted a lever 282 which is freely linked at the point 283 to the bar 281. On the bracket 66 is freely linked at 284 a short lever 285 similar to the said lever 282. On the stay rod 259 is a curved lever 286 connected by means of a link 287 to another lever 288, which lever 288 also pivoted at 284 has a rigid bent extension 289 linked by a link 290 to a bell crank lever 291 mounted in the machine frame 11 and carrying a bowl 292 which engages a cam 293 (Figure 1), the lever being held to its work by a spring 294 (Figure 4). The lateral motion thus given to the rod 281 is converted into an independent vertical motion of the plunger 261 relatively to the rammer or stamper bar 260. The rammer is moved by the cross head. The measured charge is supplied to the hopper 70 while the rammer is near the bottom of its stroke, and on the rammer rising it allows the charge to fall into the bag; the rammer then descends, the point of the plunger 261 breaking up any central mound or elevation on the surface of the charge and distributing its components to the sides or corners of the bag, after which the end of the main rammer overtaking the point flattens the charge ready for the folding over of the top of the bag to make a packet, the inner wall or plate 225 of the mould, which as aforesaid is supported by springs 239, giving way slightly to avoid excessive crushing of the charge, which in the case of tea is liable to break it up into dust. The said inner plate may be pressed in by a cam or other convenient means, after the rammer has been withdrawn, to ensure that firm packets of uniform size are produced, a further movement of the cam releasing the packet from pressure.

When this machine is used to make paper bags only, the mould can be removed and the rammer may or may not be used to remove the bags from the "former." The empty bags will be taken out of the machine without being subjected to the action of the lower plates or arms of the folders, which are only required for closing filled packets.

The bag when filled will usually leave the "former" and descend into the mould by the pressure of the stamper on the top of the material in the funnel or former, but means such as those shown in Figure 16 may be provided for ensuring the disengagement of the bag from the "former." By the extension of the shaft 161 to the table 172 a guide is provided for a sleeved bracket 295 a forked arm 296 of which engages the guide 250. At the upper end of the boss 295 is a scraper or ejector fork 297 suitably shaped to enclose the "former" 71 and provided with studs 300 to ensure its hold of the paper which studs co-act with vertical grooves in each side of the "former" which grooves also allow the escape of air when the bag is being filled. A link 298 pivotally connected to the bracket 295 is connected with a bell crank lever 299 on the stay rod 217 to work this ejector, which descends at the same speed as the descending mould.

As soon as the rammer reaches in its down-stroke the square part of the former, the next charge can be dropped into the funnel at the head of the former, where it remains by reason of the rammer being of about the same diameter as the former, until the rammer has completed its down-stroke and rises again, this period being equal to about half a revolution of the main driving shaft of the machine, so that accurate timing of the feed of tea to the funnel is not so necessary as is the case in other packing machines. By this arrangement the running of the machine at a high speed is greatly facilitated. On the rammer rising to the position in which its operative part is at or near the bottom of the former, another sheet of paper can be folded and sealed on the former. The "last folder" meanwhile descends further and clears the slotted mould and bracket 224 leaving the filled bag resting on ledges at or below the bottom of the mould; the said last folder is then drawn back, raised to its first position opposite the space between the former and the mould, and in its turn advances to give the last fold to the top of the filled packet and the bottom of the following bag, after the other folders have operated. The mould then rises to receive the next bag, leaving the filled packet under the last folder to be transferred by suitable ejecting mechanism to a belt, trough, or labelling machine.

In some cases it may be found advantageous to make the mould stationary, and to cause the "former" to rise and fall for the purpose of transferring the bag to the mould.

The finished packets may be ejected from the machine by any suitable means, as for example by that now to be described:—
On the machine frame is pivoted at 301 (Figure 2) a lever 302 held in position by a spring 303 and carrying a bowl 304 engaging a cam 305 secured on the wheel 23 which is mounted on the shaft 24, to which lever 302 is pivoted a bent plate 306, which has a front flange 307 (Figure 17) which pushes the filled packets off the platform 224 located below the mould. In order to facilitate the operation of the machine at a high speed, the ejector plate 306 moves on a rectangular path, also by so doing it avoids disturbing the next packet which immediately takes the place of the one thus ejected, until the folders have closed in the top of the said next packet, that is, after pushing off a packet the said plate 306 descends, recedes, rises, and then is ready to advance again. Mounted on the shaft 136 is a cam (not shown) engaging a bowl 310 on a lever 311 adapted to rock on the rod 141 and connected by means of suitable links and universal joints to the ejector plate 306 to give it a rising and falling movement, its advancing and receding movements being effected by the cam 305.

When the packet is pushed off the plate 224 it enters an open-sided box or tumbler 312 one end of which is pivoted at 313 to the machine frame so that the said box or tumbler can turn through an arc of 90 degrees, that is, it assumes a vertical position to receive the packet, and swings into a horizontal position to place the packet in position for being discharged through the final ejector trough 319. This movement of the box or tumbler is obtained by means of a cam 314 on the shaft 136 engaging a bowl 315 on a lever 316 pivoted on the rod 141, the lever 316 being linked by a swivel joint at 317 to the tumbler. In the drawings Figures 18 and 19 the tumbler is shown in the lowered position. The pusher plate 318 is reciprocated in relation to the trough 319 to discharge the finished packets, by a lever 320 operated by a face cam 321 on the shaft 24.

In order to prevent the feeding of the paper from continuing in the event of a failure in the supply of the tea or other material to be packed, a balanced feeler resting on the said material in the funnel portion of the former may be employed to control mechanical or electrical devices for throwing out of action the pawls of the paper feed drum when the supply fails; or the pawls may be normally disengaged, and only come into engagement as each charge is delivered, owing to the action of the feeler or the charge in falling into the funnel effecting the engagement. Figure 20 illustrates an example of mechanism for the above purpose, in which a flap 322 is hinged on the edge of the hopper 70, this flap having a pendent tailpiece 323 connected by a link 324 with a rocking pawl 325. The flap 322 is by any suitable motion lifted to allow the entry of a charge of material to the hopper, and then allowed to rest on the surface of such charge of material. In Figure 20 is shown a rising and falling rod 326 which is connected at its lower end by a link 327 to a bell crank lever 328 actuated by a cam 329 on the shaft 24 and fulcrumed on the shaft 58. The rod 326 is lifted by means of a spring 330. To the upper end of the sliding rod 326 is connected a radius bar 331 forming a cam path. When the flap 322 drops below its normal position by reason of the absence of the charge, the tail-piece is thereby actuated to rock the pawl 325 so that the said pawl engages the projection 333 on the bar 326 and prevents the radius bar 331 from being lifted clear of the pawls 31, 32, 33 thus stopping the feed of the paper. The said lifting of the flap 332 may be effected by a cam 334 on the shaft actuating a lever 335 linked by a rod 336 to the tailpiece 323.

The radius bar 331 can be lifted if required by means of a shaft 338 (Figure 2) actuating a cam 339 which engages a projection on the bar 326, this shaft 338 being moved by either of the handles 29, 39.

The machine may comprise a single former and mould with their accessory working parts, or two or more sets of formers and moulds may be embodied in one machine.

What I claim and desire to secure by Letters Patent of the United States is:—

1. A machine for the purposes set forth, comprising in combination a stationary charging funnel having a vertical hollow stem, consecutively acting folding devices to complete a bag on said stem, means for filling said bag in the position in which it is made, the last folding device having alternate horizontal and vertical movements, and a mould vertically slotted to give passage to said folding device, said mould being always vertically under said stem throughout the action of the machine.

2. A machine for the purposes set forth, comprising in combination a stationary charging funnel having a vertical hollow stem, consecutively acting folding devices to complete a bag on said stem, means for filling said bag in the position in which it is made, a charge rammer vertically movable in said funnel and stem, the last folding device having alternate horizontal and vertical movements, and a mould vertically slotted to give passage to said folding device, said mould being always vertically under said stem throughout the action of the machine.

3. A machine for the purposes set forth, comprising in combination a non-revolving charging funnel having a hollow stem, means for wrapping a sheet of flexible material such as paper around said stem, a charge rammer vertically movable in said funnel and stem, a vertically slotted mould and a stationary ejector platform to receive a packet, said mould and platform both being located and always remaining vertically under said stem throughout the action of the machine, means for folding said flexible material under said stem, and means for simultaneously completing the folding of the top of a packet projecting above said mould.

4. In a machine for the purposes set forth, a stationary charging funnel having a hollow stem, means for wrapping flexible material such as paper around said stem to form a tube open at both ends and having its lower extremity projecting below such stem, a vertically slotted mould vertically under said stem, a folding device adapted to make simultaneously the first fold in the lower extremity of said tube and the first fold in the upper extremity of a previously filled bag in said mould, and a plurality of consecutively acting folding devices each adapted to make a subsequent fold in the lower extremity of said tube and a corresponding subsequent fold in the upper extremity of said previously filled bag in said mould.

5. In a machine for the purposes set forth, a stationary funnel having a vertically depending hollow stem, means for wrapping flexible material such as paper around said stem to form a tube open at both ends and having its lower extremity projecting below said stem, four consecutively acting folders to fold the said projecting lower extremity to constitute the bottom of a bag while the remaining part of said tube constitutes the walls of said bag, the fourth folder being adapted to descend with said bag, a slotted mould and a stationary ejector platform both located vertically below said stem and adapted to give passage to said fourth folder and to receive said bag therefrom, and an ejector to remove said bag from said platform.

6. In a machine for the purposes set forth, a stationary funnel having a vertical hollow stem, horizontally acting means for wrapping around said stem a sheet of flexible material such as paper having one of its vertically disposed edges coated with adhesive material, means for rubbing said sheet to seal said edge to form a tube open at both ends and having its lower extremity projecting below said stem, four consecutively acting folders to fold the said projecting lower extremity to constitute the bottom of a bag while the remaining part of the said tube constitutes the walls of said bag, the fourth folder being adapted to descend with said bag, a slotted mould and a stationary ejector platform both located vertically below said stem, and adapted to give passage to said fourth folder and to receive said bag therefrom, and an ejector to remove said bag from said platform.

7. In a machine for the purposes set forth, a stationary charging funnel having a hollow stem, means for wrapping flexible material such as paper around said stem to form a tube open at both ends and having its lower extremity projecting below said stem, means for folding the projecting lower extremity of said tube to constitute the bottom of a bag while the remaining part of said tube constitutes the walls of said bag, a vertically reciprocable rammer adapted to rise above said stem to admit the charge thereto, said rammer being also adapted when lowered to pass within said stem and to ram the charge in said bag, a slotted mould vertically under said stem, and means for transferring said bag to said mould.

8. In a machine for the purposes set forth, a stationary charging funnel having a hollow stem, means for wrapping flexible material such as paper around said stem to form a tube open at both ends and having its lower extremity projecting below said stem, means for folding the projecting lower extremity of said tube to constitute the bottom of a bag while the remaining part of said tube constitutes the walls of said bag, a vertically reciprocable rammer adapted to rise above said stem to admit the charge thereto, said rammer being also adapted when lowered to pass within said stem and to ram the charge in said bag, a slotted mould vertically under said stem, said mould comprising a vertically movable portion adapted to rise to receive the filled bag from said stem and to descend to place said filled bag in position for ejection.

9. In a machine for the purposes set forth, a stationary charging funnel having a hollow stem, means for wrapping flexible material such as paper around said stem to form a tube open at both ends and having its lower extremity projecting below said stem, four folding devices adapted to act consecutively to fold the said projecting lower extremity to constitute the bottom of a bag while the remaining part of said tube constitutes the walls of said bag, means for charging said bag, a mould vertically under said stem, said mould comprising a vertically movable portion adapted to be raised to enclose said filled bag and the operative blade of the fourth folder, said movable portion being slotted to give passage to said fourth folder, means for closing the top of said filled bag, a stationary ejector platform, means for lowering said movable mould portion and said fourth folder to place the filled bag on said ejector platform and to continue the movement of said fourth folder below said ejector platform, and an ejector to remove said filled bag from said platform when said movable mould portion has again risen.

10. In a machine for the purposes set forth, a stationary charging funnel having a hollow stem, means for wrapping flexible material such as paper around said stem to form a tube open at both ends and having its lower extremity projecting below said stem, four folding devices adapted to act consecutively to fold the said projecting lower extremity to constitute the bottom of a bag while the remaining part of said tube constitutes the walls of said bag, a vertically reciprocable rammer adapted to rise above said stem to admit the charge thereto, said rammer being also adapted when lowered to pass within said stem and to ram the charge in said bag, a mould vertically under said stem, said mould comprising a vertically movable portion adapted to be raised to enclose said filled bag and the upper operative blade of the fourth folder, said movable portion being slotted to give passage to said fourth folder, means for closing the top of said filled bag, a stationary ejector platform, means for lowering said movable mould portion and said fourth folder to place the filled bag on said ejector platform and to continue the movement of said fourth folder below said ejector platform, and an ejector to remove said filled bag from said platform when said movable mould portion has again risen.

11. In a machine for the purposes set forth, a stationary charging funnel having a vertically depending hollow stem, means for wrapping flexible material such as paper around said stem to form a tube open at both ends and having its lower extremity projecting below said stem, four consecutively acting folders to fold the said projecting lower extremity to constitute the bottom of a bag while the remaining part of said tube constitutes the walls of said bag, means for charging said bag, a vertically reciprocable mould to receive said bag arranged vertically below said stem, means for closing the top of said bag, means for imparting to the fourth of the aforesaid folders a movement in a rectangular path to transfer said bag when filled to a stationary ejector platform arranged vertically below said stem and to return said fourth folder to its operative position, said platform and said mould being slotted to give passage to said folder, and an ejector to remove said bag from said platform.

12. In a machine for the purposes set forth, a stationary charging funnel having a vertically depending hollow stem, means for wrapping flexible material such as paper around said stem to form a tube open at both ends and having its lower extremity projecting below said stem, four consecutively acting folders to fold the said projecting lower extremity to constitute the bottom of a bag while the remaining part of said tube constitutes the walls of said bag, a vertically reciprocable rammer adapted to rise above said stem to admit the charge thereto, said rammer being also adapted when lowered to pass within said stem and to ram the charge in said bag, a vertically reciprocable mould to receive said bag arranged vertically below said stem, means for closing the top of said bag, means for imparting to the fourth of the aforesaid folders a movement in a rectangular path to transfer said bag when filled to a stationary ejector platform arranged vertically below said stem and to return said fourth folder to its operative position, said platform and said mould being slotted to give passage to said folder, and an ejector to remove said bag from said platform.

13. In a machine for the purposes set forth, a stationary charging funnel having a vertically depending hollow stem, means for wrapping flexible material such as paper around said stem to form a tube open at both ends and having its lower extremity projecting below said stem, four consecutively acting folders to fold the said projecting lower extremity to constitute the bottom of a bag while the remaining part of said tube constitutes the walls of said bag, a vertically reciprocable rammer adapted to rise above said stem to admit the charge thereto, said rammer being also adapted when lowered to pass within said stem and to ram the charge in said bag, said rammer being provided with an auxiliary plunger resiliently supported and movable in relation to said rammer, said plunger being adapted to engage the material packed in advance of the said rammer, which rammer afterwards overtakes said plunger, and a slotted mould arranged vertically under said stem.

14. In a machine for the purposes set forth, a stationary charging funnel having a vertically depending hollow stem, means for wrapping flexible material such as paper around said stem to form a tube open at both ends and having its lower extremity projecting below said stem, four consecutively acting folders to fold the said projecting lower extremity to constitute the bottom of a bag while the remaining part of said tube constitutes the walls of said bag, a vertically reciprocable rammer adapted to rise above said stem to admit the charge thereto, said rammer being also adapted when lowered to pass within said stem and to ram the charge in said bag, said rammer being provided with an auxiliary plunger resiliently supported and movable in relation to said rammer, said plunger being adapted to engage the material packed in advance of the said rammer, which rammer afterwards overtakes said plunger; a vertically reciprocable mould to receive said bag arranged vertically below said stem, means for closing the top of said bag, means for imparting to the fourth of the aforesaid folders a movement in a rectangular path to transfer said bag when filled to a stationary ejector platform arranged vertically below said stem, and to return said fourth folder to its operative position, said platform and said mould being slotted to give passage to said folder, and an ejector to remove said bag from said platform.

15. In a machine for the purposes set forth, a stationary charging funnel having a hollow stem, means for wrapping flexible material such as paper around said stem to form a tube open at both ends and having its lower extremity projecting below said stem, means for folding the projecting lower extremity of said tube to constitute the bottom of a bag while the remaining part of said tube constitutes the walls of said bag, a vertically reciprocable rammer adapted to rise above said stem to admit the charge thereto, said rammer being also adapted when lowered to pass within said stem and to ram the charge in said bag, a mould vertically under said stem, a stationary ejector platform, said mould comprising a vertically movable portion adapted to rise to receive the filled bag from said stem and to descend to place said filled bag on said ejector platform, said vertically movable portion of the mould comprising a rigidly supported back plate, rigidly supported outer walls, and an inner wall movable in relation to said outer walls.

16. In a machine for the purposes set forth, a stationary charging funnel having a hollow stem, means for wrapping flexible material such as paper around said stem to form a tube open at both ends and having its lower extremity projecting below such stem, a vertically reciprocable rammer adapted to work within said funnel, a vertically reciprocable mould under said stem, a stationary ejector platform under said mould, a laterally movable ejector adapted to sweep over said platform when said mould is raised, and four consecutively acting folding devices each adapted to fold simultaneously the lower extremity of said tube and the open end of a packet in said mould, the said parts being so timed and arranged that two cycles of operations proceed simultaneously, one of said cycles comprising the formation of the tube of flexible material on the stem of the funnel, closing the bottom of said tube to form a bag, lifting the rammer in the funnel to allow the whole charge to fall into the bag while the bag is still on the stem, transferring the charged bag to the mould and ramming the charge, while the other cycle comprises folding the top of the last preceding bag to form a packet in the mould, lifting the mould clear off said packet, which then lies on the ejector platform, and ejecting the said packet laterally before the mould returns.

17. A machine for the purposes set forth, comprising in combination a hollow vertically disposed and fixed shaping former provided at its upper part with a funnel, a horizontally reciprocating folding box having a spring supported back plate and a spring finger adapted to hold paper, horizontally acting radial seam folders, a radial rubber faced pressing device, pivoted front folder blades having compound forward and oscillating movements, horizontally acting side folders, a back folder having compound horizontal and vertical movements, a vertical reciprocating rammer controlling the discharge of material from said funnel into the bag while said bag is on the former, and pressing said material in said bag, a vertically movable internal auxiliary plunger contained in and operating through said rammer, a bag ejector having intermittent vertical reciprocatory movements and adapted to co-operate with the former to release the bag therefrom, an oscillating feeder controlling the paper feeding mechanism, a vertically movable slotted mould to receive the bag from the former, and a packet ejector having a compound horizontal and vertical movement to receive packets from said mould.

ALBERT DAY.